United States Patent

[11] 3,630,112

| [72] | Inventor | Kenneth J. Sudholt<br>3801 Fair Oaks Drive, Granite City, Ill. 62040 |
|---|---|---|
| [21] | Appl. No. | 855,306 |
| [22] | Filed | Sept. 4, 1969 |
| [45] | Patented | Dec. 28, 1971 |

[54] MACHINE TOOL CENTER
9 Claims, 7 Drawing Figs.

[52] U.S. Cl. .................................................. 82/33 R, 82/33 A
[51] Int. Cl. ...................................................... B23b 23/04
[50] Field of Search ........................................... 82/33 A

[56] References Cited
UNITED STATES PATENTS

| 2,951,407 | 9/1960 | Olson .......................... | 82/33 A |
| 3,392,612 | 7/1968 | Turner ......................... | 82/40 |

FOREIGN PATENTS

| 721,744 | 1/1955 | Great Britain ................ | 82/33 A |

*Primary Examiner*—Leonidas Vlachos
*Attorney*—Gravely, Lieder & Woodruff

ABSTRACT: A machine tool center includes a housing in which an outer sleeve is journaled by means of bearings. The outer sleeve is provided with an eccentric bore which receives an inner sleeve also having an eccentric bore, the eccentricities of the bores relative to outer surfaces of their respective sleeves being equal to that the sleeves may be turned such that the eccentricities offset each other and thus position the axial centerline of the inner sleeve bore coincident to the axis of rotation for the bearing. The inner sleeve bore receives a workpiece supporting element having a knurled conical point adapted to fit nonrotatively within the center hole at the end of a shaft or other workpiece. Worm screws are provided for both locking the sleeves and supporting element against rotation relative to one another and for rotating them relative to one another. A graduated scale on the inner sleeve indicates the magnitude of eccentricity for the conical point relative to the axis of rotation for the bearings. Once the outer sleeve is adjusted to the eccentricity corresponding to the eccentricity of the hole in the end of the workpiece, the high spot on the workpiece is brought around to a position opposite the eccentricity by rotating the conical point relative to the inner sleeve. In that position the outer surface of the workpiece will run true when the workpiece is turned from its other end.

PATENTED DEC 28 1971 3,630,112

INVENTOR
KENNETH SUDHOLT
BY Gravely, Lieder & Woodruff
ATTORNEYS

PATENTED DEC 28 1971

INVENTOR
KENNETH SUDHOLT
BY Gravely, Lieder & Woodruff
ATTORNEYS

MACHINE TOOL CENTER

BACKGROUND OF THE INVENTION

This invention relates to machine tool centers and more particularly to an adjustable live center for use with workpieces having eccentric center holes.

In much machinery of current manufacture the ends of drive, idler and similar shafts are exposed, and by reason of this fact those ends are on occasion inadvertently struck and mutilated. As a result the center holes in the exposed ends of such shafts are displaced to positions eccentric to the cylindrical surfaces of shafts. Similarly, when machinery shafts are removed for maintenance purposes, the center holes in the ends from which the shafts are pulled are often displaced to eccentric positions. In any event, shafts having eccentric center holes will not run true when placed between the centers of lathes or other machine tools, but on the contrary their cylindrical outer surfaces will tend to move eccentrically, or in other words wobble.

SUMMARY OF THE INVENTION

One of the principal objects of the present invention is to provide a center for supporting workpieces having center holes disposed eccentrically with respect to their outer surfaces. Another object is to provide a center of the type stated which can be adjusted to the eccentricity of the center hole so that the cylindrical surface of the workpiece will run true. A further object is to provide a center of the type stated which rotates with the workpiece, eliminating the need for lubrication between the center and workpiece. These and other objects and advantages will become apparent hereinafter.

The present invention is embodied in a machine tool center including a housing having a first element journaled in it for rotation about a first axis, and a second element journaled in the first element for rotation about another axis offset from the first axis. The second element carries workpiece supporting means which nonrotatively engages and supports one end of a workpiece. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION OF THE INVENTION

Figure 1:
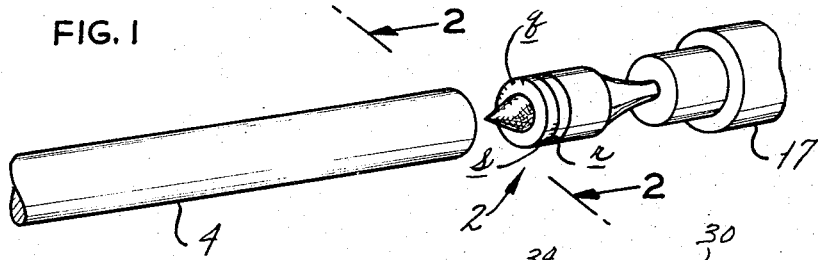
FIG. 1 is a perspective view of a machine tool center mounted in the tailstock of a lathe and positioned for engagement with a shaft having an eccentric center hole.
Figure 2:
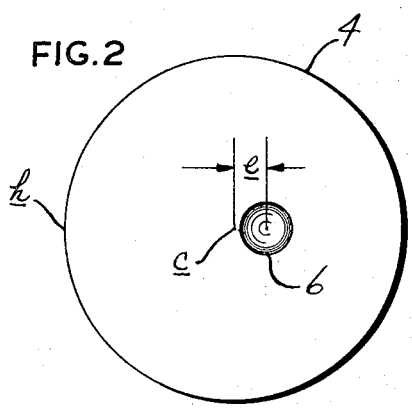
FIG. 2 is a sectional view taken along line 2—2 of FIG. 1 and showing the eccentricity of the center hole 6 in the shaft.

Referring now to the drawings, 2 designates a machine tool center for supporting a shaft 4 (FIG. 1) or other workpiece having a tapered center hole 6 (FIG. 2) extending axially inwardly from its end face. The hole 6 is offset slightly with respect to the axial centerline $c$ of the shaft 4, that is it is offset from the axis of its cylindrical surface, so that when the shaft 4 is supported between centers it possesses an eccentricity $e$.

The center 2 includes a housing 10 having a cylindrical wall 12 and a end wall 14 from which a tapered shank 16 projects. The taper of the shank 16 is of the standard Morse variety to enable the shank 16 to fit within the tailstock 17 (FIG. 1) of a conventional lathe or other machine tool (not shown). The interior surface of the wall 12 is defined by a cylindrical bore 18 which terminates at a shoulder 20, and fitted within the bore 18 are a pair of ball bearings 22 and 24, the races of which are concentric about the axial centerline of the tapered shank 16. The outer race of the bearing 22 abuts against the shoulder 20, whereas the outer race of the other bearing 24 is positioned slightly inwardly from the open end of the bore 18. The outer races of the two bearings 22 and 24 are separated by a spacer 25.

The bearings 22 and 24 carry an outer sleeve 26 having a cylindrical spindle 28 which fits within the inner races of the bearings 22 and 24 and a enlarged head 30 which projects outwardly from the forward end of the spindle 28 and encloses the forward end of the housing 10. The closure of the interior of the housing is enhanced by a slight rearwardly projecting boss 32 which extends from the main body of the head 30 into that portion of the bore 18 immediately preceding the bearing 24. The head 30 outwardly terminates at a cylindrical surface 34 which forms a continuation of the outer surface on the housing 10. Since the inner bearing races of the bearings 22 and 24 are concentric about the axial centerline $a$ of the shank 16, the outer cylindrical surface of the spindle 28 will likewise have its center on the axial centerline $a$ of the shank 16. The outer sleeve is retained within the housing by snug fit on the inner races of the bearings 22 and 24.

Figure 4:
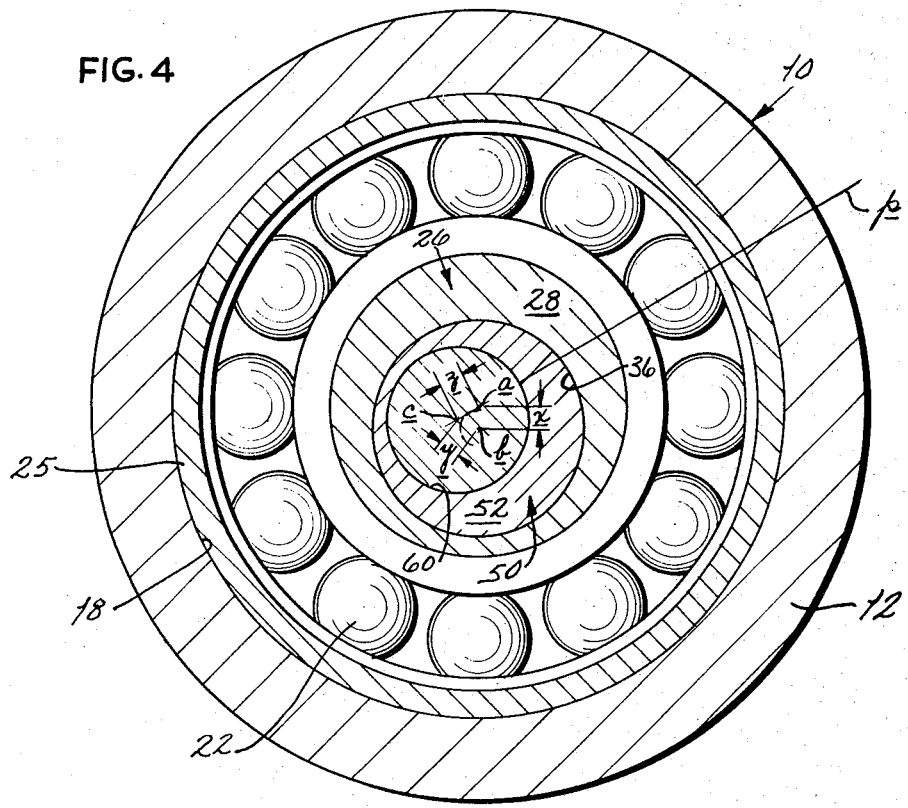
FIGS. 4, 5 and 6 are sectional views taken along lines 4—4, 5—5, and 6—6, respectively, of FIG. 3.

The outer sleeve 26 further possesses a bore 36 which extends completely through its spindle 28 and terminates at an enlarged cylindrical recess 38 located within its head 30. Both the bore 36 and the recess 38 are disposed eccentrically with respect to the cylindrical outer surface of the spindle 28, or in other words have their common axial centerlines $b$ presented parallel to but offset at a distance $x$ (FIG. 4) from the common axial centerline of the shank 16 and the axis of rotation $a$ for the spindle 28.

Figure 3:
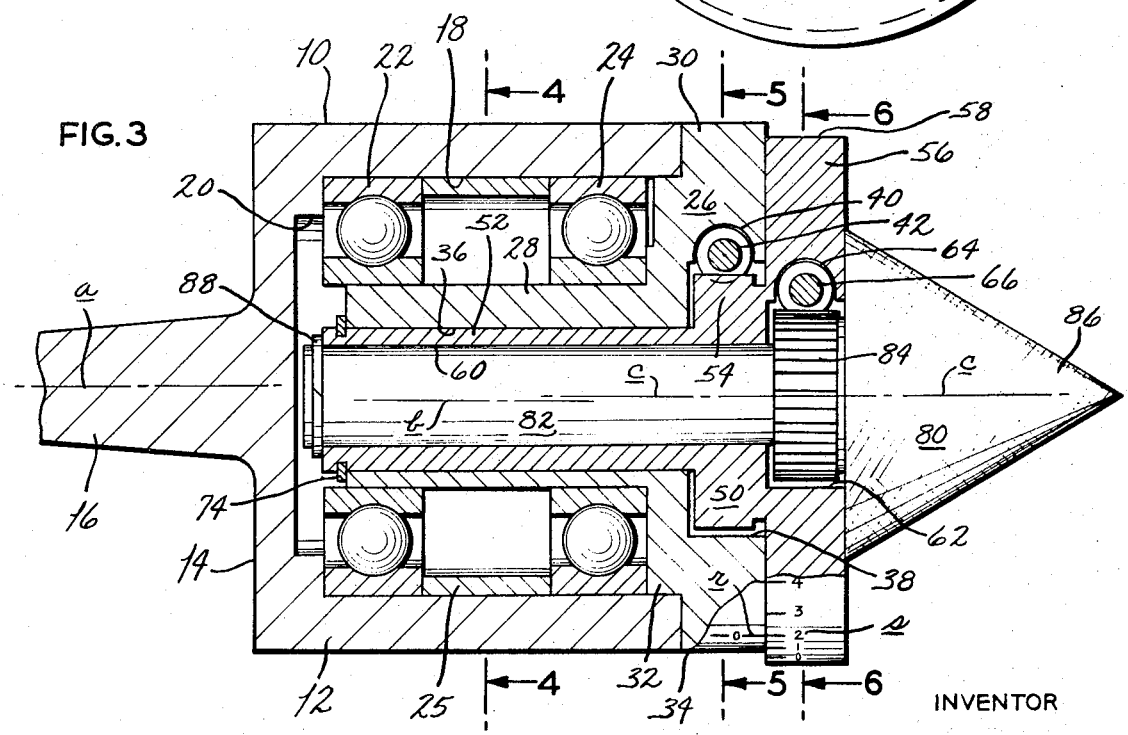
FIG. 3 is a longitudinal sectional view of the machine tool center.
Figure 5:
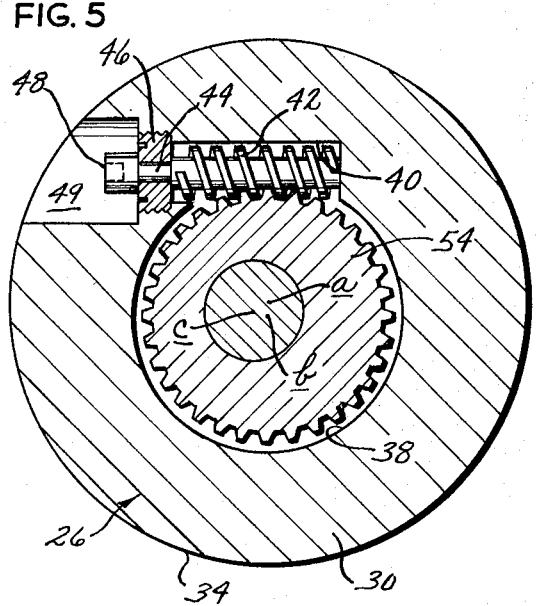

The cylindrical wall of the recess 38 intersects with a laterally extending partial bore 40 into which a worm screw 42 (FIGS. 3 and 5) is fitted, and the worm screw 42 has a reduced shank portion 44 which is journaled within a bushing 46 threaded into the head 30 outwardly from the bore 40. Beyond the bushing 46 the shank portion 44 merges into the socket head 48 presented for rotation in a recess 49 which opens outwardly through the cylindrical outer surface 34 of the enlarged head 30.

The outer sleeve 26 carries an inner sleeve 50 including a cylindrical arbor 52 which fits snugly, yet rotatively, within the eccentric bore 36. At its forward end the arbor 52 merges into a concentric worm wheel 54 (FIGS. 3 and 5) which is contained entirely within the cylindrical recess 38 of the head 30 and meshes with the worm screw 42 therein so that only rotation of the worm screw 42 will rotate the inner sleeve 50 relative to the outer sleeve 26. The worm wheel 54 in turn merges into an adjusting flange 56 which projects outwardly across the front face of the enlarged head 30 and terminates at a cylindrical surface 58 which is concentric to the worm wheel 54 and arbor 42.

The inner sleeve 50 is likewise provided with a bore 60 and a counterbore 62 which are concentric relative to one another and eccentric with respect to the outer surface of the arbor 52 and the bore 36 encircling that outer surface. The offset or eccentricity $y$ (FIG. 4) between the axial centerlines $b$ of the outer surface on the arbor 52 and the axial centerline $c$ of the bore 60 equals the eccentricity $x$ between the bore 36 and the outer surface of the spindle 28 on the outer sleeve 26. Thus, by rotating the inner sleeve 50 relative to the outer sleeve 26 the centerline $c$ will describe the path indicated by dotted lines in FIG. 4 and the two eccentricities $x$ and $y$ will either add to or subtract from one another. When the two eccentricities $x$ and $y$ align and subtract from one another the axial centerline $c$ of the bore 60 and counterbore 62 will coincide with the axial centerline $a$ of the shank 16 and the bearings 22 and 24. On the other hand, when the two eccentricities $x$ and $y$ do not align the centerline $c$ will be spaced a distance $z$ (FIG. 4) from the centerline $a$. The distance $z$ varies as the inner sleeve 50 is rotated relative to the outer sleeve 26.

Figure 6:
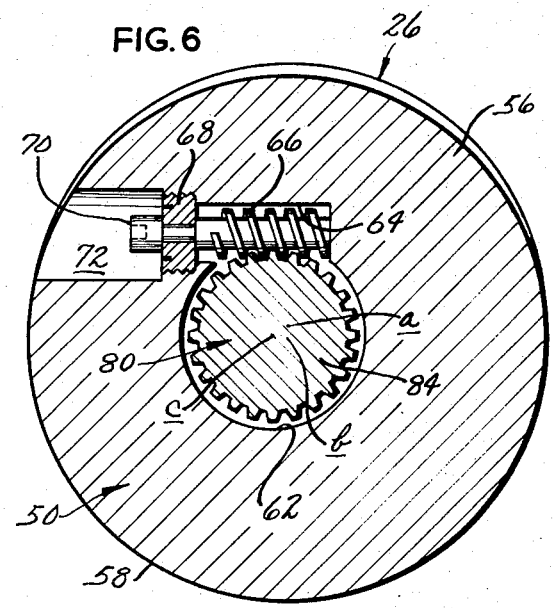

Like the head 30 on the outer sleeve 26, the adjusting flange 56 on the inner sleeve 50 includes a laterally extending partial bore 64 (FIGS. 3 and 6) which houses a worm screw 66 journaled in a bushing 68 which is threaded into the flange 56. The screw 66 terminates at a socket head 70 disposed within a recess 72 which opens laterally through the outer cylindrical surface 58 on the flange 56.

The inner sleeve 50 is retained within the outer sleeve 56 by means of a spring clip 74 which fits within a groove formed in the rear end of the arbor 52 and is disposed immediately to the rear of the rearwardly presented end face on the spindle 28.

The outer surface 58 of the flange 56 is provided with a scale $s$ (FIG. 3) which passes by a single reference mark $r$ on the outer adjacent surface 34 of the head 30 when the sleeves 26 and 50 are rotated relative to one another by the worm screw 42. The scale $s$ is graduated such that the marks thereon when considered relative to the position of the reference mark $r$ indicate the distance $z$ between the axial centerline $a$ of bearings 22 and 24 and the axial centerline $c$ of the bore 60, or in other words the true eccentricity $z$ of the bore 60. Preferably the scale $s$ is graduated in thousandths of an inch.

Figure 7:
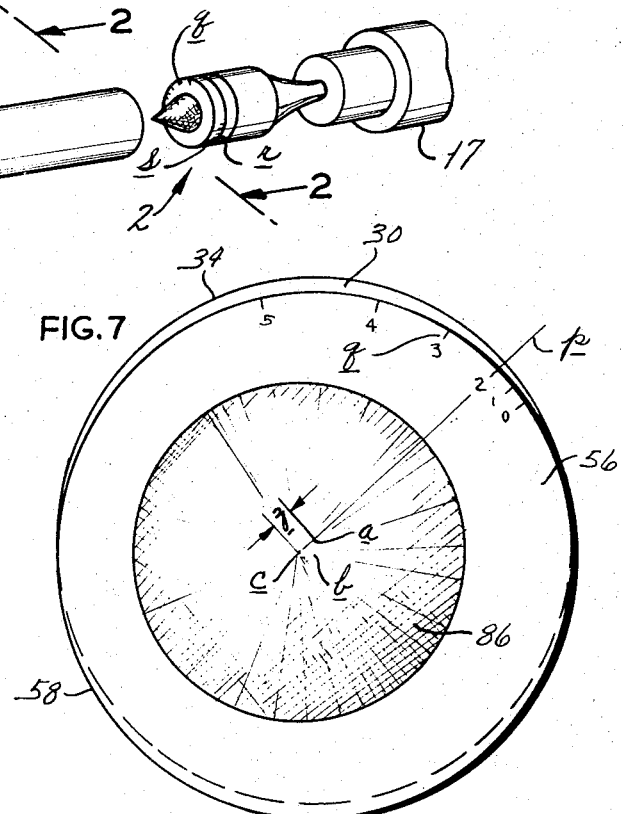
FIG. 7 is an end elevational view of the machine tool center.

The front face of the flange 56 is provided with another scale $g$ (FIG. 7) which indicates the position on the flange 56 directly opposite the axial centerline $c$ for each eccentricity $z$ set on the scale $s$. In other words, each setting on the scale $s$ has a corresponding setting on the scale $q$ denoting a line $p$ (FIGS. 4 and 7) extending from the centerline $c$ through the centerline $a$ to the outside of the flange 56.

Finally, the inner sleeve 50 carries a work supporting element 80 having an elongated shank 82 which fits snugly but rotatively within the bore 60 of the arbor 52. At its forward end the shank 82 merges into a concentric worm wheel 84 (FIGS. 3 and 6) which is contained within the counterbore 62 and meshes with the worm screw 66 therein. The worm wheel 84 in turn merges into a conical point 86, the taper of which corresponds to the taper of the centerhole 6 in the shaft 4. The conical point 86 is furthermore concentric with respect to the shank 82 so that its tip or apex lies on the axial centerline $c$ of the shank 82 and the bore 60 in the inner sleeve 50. The outer surface of the conical point 86 is knurled to prevent rotation between the shaft 4 and the work supporting element 80 when the conical point 86 is advanced snugly into the center hole 6 of the shaft 4.

The work supporting element 80 is retained within the inner sleeve 50 by means of a spring clip 88 which snaps into a groove disposed within the shank 82 beyond the rearwardly presented end face of the arbor 52.

OPERATION

The tapered shank 16 on the housing 10 is inserted into the tailstock 17 of the lathe and the worm screw 42 is turned until the zero mark on the graduated scale $s$ of the adjusting flange 56 aligns with the reference mark $r$ on the enlarged head 30 of the outer sleeve 26. In this position the eccentricity $y$ of the bore 60 in the arbor 52 is presented in direction opposition to the eccentricity $x$ of the bore 36 in the spindle 28 so that the two eccentricities $x$ and $y$ subtract from and completely offset one another. Accordingly, the tip of the conical point 86 will lie along the common axis of rotation for bearings 22 and 24 and the axial centerline $a$ of the shank 16 on the housing. The tailstock 17 of the lathe should be such that the axial centerline $a$ of the shank 16 and the tip of the conical point 86 lie coincident with the axis of rotation for the drive spindle in the headstock of that lathe.

Once the foregoing adjustment has been completed, the shaft 4 is supported in the lathe for rotation with the drive spindle thereof. In particular, the end of the shaft 4 remote from the center hole 6 may be fitted with a dog which engages a faceplate on the drive spindle, in which case the shaft 4 would be supported between centers, or it may be inserted into a chuck having independently operated jaws. In any event, that end of the shaft should be engaged with the drive spindle in some manner which will permit the outer cylindrical surface of the shaft 4 at the end remote from the center hole 6 to run true or concentric about the axis of rotation for the lathe's drive spindle. At the opposite end of the shaft the adjustable center 2 is advanced by the tailstock until the conical point 86 on its work supporting element 30 fits snugly within the eccentric center hole 6. Since the surface of the conical point 86 is knurled, the work supporting element 80 will not rotate relative to the shaft 4, and neither will the inner and outer sleeves 50 and 26 inasmuch as they are all connected to one another as well as to the work supporting element 80 through the worm screw 42 and 66.

When the shaft 4 is properly supported in the lathe, the feeler of a dial indicator is pressed against the cylindrical outer surface of the shaft 4 near the end in which the center hole 6 is located. Then the shaft 4 is rotated manually and the location of the high spot $h$ (FIG. 2) as well as the difference in thousandths of an inch between the high and low spots is noted. One-half of this difference represents the eccentricity $e$ of the hole 6 with respect to the outer cylindrical surface of the shaft 4, or in other words, the deviation between the center hole 6 and the true center of the shaft 4. With this deviation or difference $e$ in mind, the worm screw 42 is turned until the graduation of scale $s$ on the adjusting flange 56 corresponding to the deviation appears opposite the reference mark $r$ on the enlarged head 30. Of course, as the adjusting screw 42 is turned, the sleeves 26 and 50 rotate relative to one another, and this in turn causes the common axial centerline $c$ of the arbor bore 60 and conical point 86 to move away from the common axial centerline $a$ of the bearings 22 and 24 along the path indicated by the dotted line in FIG. 4. The centerline $a$ is of course coincident with the axis of rotation for the far end of the shaft 4 and the drive spindle of the lathe. When the graduation on the scale $s$ corresponding to the eccentricity $e$ of the center hole 4 appears opposite to the reference mark $r$ the two centerlines will be presented apart a distance $z$ equal to that deviation or eccentricity $e$.

Thereafter, with the shaft 4 fixed against rotation and the high spot $h$ marked thereon, the worm screw 66 is turned until the mark on the scale $q$ corresponding to the eccentricity $e$ set on the scale $s$ is brought around to the high spot $h$ of the shaft 4. More specifically, by turning the worm screw 66 of the flange 56 is rotated relative to the conical point 86 and the shaft 4 engaged by it so that the eccentricity $z$ of the centerline $c$ extending through the point 86 can be positioned directly opposite the high spot $h$ on the shaft 4. In other words, when the high spot $h$ aligns with the mark on the scale $q$ corresponding to the eccentricity $e$ the high spot $h$ will lie on a line $p$ extending through the centerlines $a$ and $c$ with the centerline $a$ interposed between the high spot $h$ and centerline $c$. In this position the outer surface at the far end of the shaft 4 will be concentric about the axis of rotation for the shaft 4, that is the centerline $a$.

Now when the drive spindle of the lathe is energized, the work supporting element 80, and the sleeves 50 nd 26 will revolve in unison within the bearings 22 and 24, inasmuch as the conical point 86 is secured against rotation relative to the shaft 4 by means of knurled surface thereon. The worm screw 42, of course, locks the outer sleeve 26 to the inner sleeve 50, while the worm screw 66 locks the inner sleeve 50 to the work supporting element 30. Thus, the outer surface of the shaft 4 will run true notwithstanding the eccentricity of its center hole 6, and desired machining operations may be performed upon it.

By way of example, if the difference between the high and low spots on the far end of the shaft is 0.020 inch when the shaft is manually rotated with the scale $s$ set at zero eccentricity, then the true eccentricity $e$ of the shaft is 0.010 inch and the worm screw 42 is rotated until that reading on the scale $s$ appears opposite the reference mark $r$. Next, the worm screw 66 is rotated until the high spot $h$ aligns with, that is positioned at, the mark 0.010 appearing on the scale $q$. When this occurs the eccentricity $z$ set into the tool center 2 will completely offset the eccentricity $e$ in the end of the shaft 4 so that the shaft 4 will run true.

To avoid dividing by 2 after the difference between the high and low spots on the shaft 4 is obtained from the dial indicator, the scales $s$ and $q$ may be graduated to correspond to readings taken directly from the dial indicator.

While the operation of the adjustable center 2 has been described in conjunction with a lathe, it may also be used with other machine tools such as grinders. Similarly, the workpiece need not necessarily be a shaft but may also be any type an object capable of engagement with and being supported by the center 2.

The work supporting element 80 and the inner sleeve 50 may be formed integral with one another in which case the worm screw 66 and associated components would be eliminated and the conical point 86 would project directly from the adjusting flange 56. In such a construction, once the eccentricity was set by turning the worm screw 42, the high spot $h$ would be positioned by withdrawing the conical point 86 from the center hole 6 slightly, then turning the shaft 4 relative to the point 86, and thereafter reinserting the conical point 86 into nonrotative engagement with the center hole 6 after the high spot $h$ has been correctly positioned.

In the drawings the magnitude of the eccentricities $x$ and $y$ has been exaggerated to more clearly illustrate the invention.

This invention is intended to cover all changes and modifications of the example of the invention herein chosen for purposes of the disclosure which do not constitute departures from the spirit and scope of the invention.

What is claimed is:

1. A center for use with a machine tool which is capable of rotating a workpiece; said center being capable of rotatably supporting the workpiece and comprising: a housing mountable on the machine tool, a first mounting element journaled in the housing for rotation about a first axis, a second element journaled in the first element for rotation about a second axis which is offset from the first axis, first locking means for securing the first and second elements together so that they do not rotate relative to one another, and workpiece supporting means carried by and journaled in the second element for rotation about a third axis which is offset from the second axis, the workpiece supporting means being engageable with the workpiece such that relative rotation between the supporting means and the workpiece is precluded, and second locking means for securing the second element and the workpiece supporting means together so that they do not rotate relative to one another, whereby when the first and second elements are rotated relative to another the position of the workpiece supporting means with respect to the first axis will change.

2. A center according to claim 1 wherein the first locking means comprises a worm screw on the first element and a meshing worm wheel on the second element whereby the first and second elements will rotate relative to one another only when the worm screw is turned; and wherein the second locking means comprises a worm screw on the second element and a meshing worm wheel on the workpiece supporting means, whereby the workpiece supporting means will rotate relative to the second element only when the worm screw on the second element is rotated.

3. A center according to claim 1 wherein the offset between the first and second axes equals the offset between the second and third axes so that the second element can be rotated relative to the first element to a position wherein the first and third axes coincide.

4. A center according to claim 3 wherein one of the elements is provided with a reference mark, and the other is provided with a first graduated scale which passes the reference mark as the elements are rotated relative to one another, the scale being graduated to indicate the distance between the first and third axes.

5. A center according to claim 3 wherein the work supporting means includes a conical point which fits within a tapered center hole in the shaft; and wherein the center axes of the conical point coincides with the third axis.

6. A center for use with a machine tool which is capable of rotating a workpiece; said center being capable of rotatively supporting the workpiece and comprising: a housing mountable on the machine tool, bearings contained within the housing, a first mounting element journaled in the housing by the bearings for rotation about a first axis, a second element journaled in the first element for rotation about a second axis which is offset from the first axis, first locking means for securing the first and second elements together so that they do not rotate relative to one another, and workpiece supporting means carried to by the second element and engageable with the workpiece such that relative rotation between the supporting means and the workpiece is precluded, whereby when the first and second elements are rotated relative to one another the position of the workpiece supporting means with respect to the first axis will change.

7. A center according to claim 6 wherein first element comprises a spindle extending into and journaled in the bearings, and an enlarged head at the end of the spindle, the spindle having a bore extending through it which is eccentric to the bearings and its outer surface and concentric about the second axis; and wherein the second element comprises an arbor in the bore of the spindle, and a flange on the end of the arbor and located adjacent to the head; and wherein the work supporting means includes a conical point which projects beyond the flange, the center axis of the conical point forming a third axis which is offset from the second axis a distance equal to the offset between the first and second axes, whereby the third axis may be brought into coincidence with the first axis by rotating the head and flange relative to one another.

8. A center according to claim 7 wherein the arbor is provided with a bore located eccentrically with respect to its outer surface and to the bore in the spindle and concentric about the third axis; wherein the workpiece supporting element further includes a shank extending from the conical point into the bore in the arbor, the shank and conical point being coaxial and having their common axis coincident with the third axis; and wherein second locking means are provided for preventing relative rotation between the conical point and the arbor.

9. A center according to claim 4 wherein the second element is provided with a second scale denoting positions on the second element which are along lines extending from the third axis through the first axis for corresponding positions on the first scale.

* * * * *